United States Patent [19]

Hampton et al.

[11] 4,263,188

[45] Apr. 21, 1981

[54] AQUEOUS COATING COMPOSITION AND METHOD

[75] Inventors: George J. Hampton, Belmont; William F. Maida, San Jose, both of Calif.

[73] Assignee: Verbatim Corporation, Sunnyvale, Calif.

[21] Appl. No.: 41,728

[22] Filed: May 23, 1979

[51] Int. Cl.$^3$ .................... C08L 75/04; H01F 1/00
[52] U.S. Cl. .................... 260/29.2 TN; 252/62.54; 260/37 N; 427/128
[58] Field of Search ....... 260/29.2 TN, 37 N, 40 TN; 252/62.54; 427/130, 128

[56] References Cited

U.S. PATENT DOCUMENTS

| | | | |
|---|---|---|---|
| 3,542,505 | 11/1970 | Pittman et al. | 260/29.2 TN |
| 3,725,285 | 4/1973 | Denk et al. | 252/62.54 |
| 4,076,861 | 2/1978 | Furukawa et al. | 252/62.54 |
| 4,096,127 | 6/1978 | Schurmann et al. | 260/29.2 TN |
| 4,152,485 | 5/1979 | Mitzumura et al. | 252/62.54 |

*Primary Examiner*—Theodore E. Pertilla
*Attorney, Agent, or Firm*—Flehr, Hohbach, Test, Albritton & Herbert

[57] ABSTRACT

An aqueous coating composition for forming a magnetic tape which has good adhesion for polyethylene terephthalate substrate. The composition is a stable dispersion in water of urethane with carboxylic acid groups in the backbone chain and includes a polyfunctional cross-linking agent.

7 Claims, No Drawings

AQUEOUS COATING COMPOSITION AND METHOD

BACKGROUND OF THE INVENTION

The invention relates to an aqueous magnetic tape formulation for coating the flexible tape substrate.

Conventional magnetic tape formulations for deposition on a flexible polymer backing (e.g., polyethylene terephthalate) use expensive toxic flammable organic solvents. When drying the coatings, the solvents must be captured to prevent air pollution which requires expensive capital equipment. To the present time, no aqueous magnetic tape coating formulation to avoid this problem has been developed with good adhesion to such backing with the necessary cohesive strength required of magnetic coatings.

SUMMARY OF THE INVENTION AND OBJECTS

It is an object of the invention to provide an aqueous magnetic recording tape coating composition with good adhesion to the underlying polymeric substrate, particuarly polyethylene terephthalate. According to the invention, the magnetic pigment-containing coating composition comprises a stable aqueous dispersion of magnetic pigment and polyurethane with carboxylic acid groups in the backbone chain. Preferably it also includes a polyfunctional cross-linking for the polyurethane.

The coating composition of the present invention is unique in that it is water-based and is capable of firm adhesion to a conventional flexible organic polymer substrate or backing in accordance with known procedures to form magnetic tape. One common substrate is a polyethylene terephthalate such as sold under the trademark "Mylar" by DuPont. Other substrates of similar properties could be employed.

The solids content of a magnetic coating composition useful in accordance with the present invention are set out in the following Table I.

TABLE I

MAGNETIC COATING FORMULATION

| Ingredients | Suitable Range (Dry Weight) | Preferred Range (Dry Weight) |
|---|---|---|
| Magnetic pigment (gamma $Fe_2O_3$) | 60 to 90 | 65 to 75 |
| Anti-static agent (carbon black) | 0 to 10 | 3 to 6 |
| Wetting agent | 0.25 to 2 | 0.5 to 1.0 |
| Dispersant | 0.25 to 2 | 0.5 to 1.0 |
| Antifoam agent | 0.25 to 2 | 0.5 to 1.0 |
| Lubricant (butoxyethyl stearate) | 0.25 to 5 | 0.75 to 1.5 |
| Urethane binder (polyurethane) | 15 to 30 | 18 to 22 |
| Crosslinking agent | 0 to 10 | 2 to 5 |

Many of the ingredients in Table I serve the same function in the above formulation as in a conventional magnetic tape, e.g., the magnetic pigment, carbon black and the like. It should be understood that the proportions of ingredients in the formulation may be varied to provide the desired properties without departing from the scope of the invention.

The foregoing ingredients are dispersed in water for uniform coating followed by evaporation of the water. The proportions of ingredients are set out on a dry basis. Typically, such ingredients are added to the water at a concentration of about 25 to 50% by weight solids.

The magnetic pigment may be of a conventional type used in the recording industry, suitably $Fe_2O_3$ in gamma form. This material comprises the major portion of the magnetic tape coating. Typical coating thicknesses are on the order of 50 to 500 microinches depending upon the end use of the tape.

Carbon black is a prefered anti-static agent included in the coating. One suitable carbon black is supplied by Cabot Corporation under the trademark "Vulcan XC-72R."

Wetting agents and dispersants for the magnetic pigment and carbon black are included to permit ready dispersion in the water. Suitable ones well known in the latex paint industry are (1) a sodium salt of a carboxylate polyelectrolyte dispersant sold by Rohm & Haas Company under the trademark Tamol 731 and (2) an alkylaryl polyether alcohol nonionic liquid surfactant sold under the Triton CF-10 trademark, also by Rohm & Haas Co. Other similar wetting agents could be substituted.

It is desirable to prevent excessive air entrapment in the formulation. For this purpose, an anti-foaming agent may be added to the formulation. A suitable one is a hydrocarbon base fatty acid ester silicone blend liquid defoamer sold under the trademark "Nopco NXZ" by Diamond Shamrock Chemical Company.

Another conventional ingredient is a lubricant to reduce friction or drag of the magnetic tape across a recording head. Common lubricants include butoxyethyl stearate, squalane, and silicone oils.

The binder of the present invention is a polyurethane with carboxylic acid groups in the backbone chain. A particularly effective polyurethane is of the aromatic type available in an anionic stabilized aqueous colloidal dispersion sold under the trademark "NeoRez EX-467" by Polyvinyl Chemical Industries. This particular formulation has a 27% by weight solids content. The aromatic polyurethane exhibits exceptional adhesion to a polyethylene terephthalate substrate film. It is believed that this is due to strong affinity of the aromatic polyurethane for the aromatic ester portion of the substrate.

An aliphatic polyurethane may also be employed to replace the aromatic polyurethane in the coating composition but such composition is not as adhesive as the substrate. The aliphatic polyurethane is a similar polymer in which the backbone chain includes carboxylic acid groups. A particularly suitable anionic stablized aliphatic polyurethane aqueous colloidal dispersion is sold under the trademark "NeoRez R-960" by Polyvinyl Chemical Industries.

It is preferable for high precision magnetic recording tapes such as for use in video and computer tape to also include a polyfunctional cross-linking agent for cross-linking the polyurethane alone and to the substrate. Such agent serves to increase the adhesivity of the coating composition for the substrate and to provide imporved durability. One highly effective cross-linking agent is a poly-functional aziridine, such as sold under the trademark "CX-100" by Polyvinyl Chemical Industries or XAMA 7 by Cordova Chemical.

For stability, the foregoing colloidal dispersion should be at a pH level in excess of 7.5 to 8.5. The iron oxide commonly supplied for magnetic tapes include acid salts which reduce the pH of the iron oxide to levels as low as 3.0. Thus, to stabilize the dispersion, it is preferable to add an alkali pH adjusting agent. Ammonium hydroxide is preferred because it evaporates after coating.

A further disclosure of the nature of the present invention is provided by the following specific examples of the practice of the invention. It should be understood that the data disclosed serve only as examples and are not intended to limit the scope of the invention.

EXAMPLE 1

A coating of the composition set out in Table II below is formed by the following procedure.

TABLE II

MAGNETIC COATING FORMULATION

| Ingredients | Parts by wt. (wet) | Parts by wt. (dry) | Supplier |
|---|---|---|---|
| Water | 30.800 | — | — |
| pH adjusting agent (NH$_4$OH(28% by volume in water) | 1.253 | — | — |
| Polyurethane binder (NeoRez EX-467, 27% solids by wt. in water) | 32.573 | 20.011 | Polyvinyl Chem. Ind. |
| Antifoam agent (Nopco NXZ) | 0.328 | 0.746 | Napco Chem. Co. |
| Dispersant (Tamol 731) | 0.320 | 0.728 | Rohm & Haas |
| Wetting agent (Triton CF-10) | 0.320 | 0.720 | Rohm & Haas |
| Lubricant (Butoxyethyl stearate) | 0.438 | 0.997 | Armak Chem. Div. |
| Magnetic pigment (Gamma-Fe$_2$O$_3$) | 29.789 | 67.789 | Hercules Corp. |
| Anti-static agent (carbon black Vulcan XC-72R) | 2.190 | 4.983 | Cabot Corp. |
| Crosslinking agent (CX-100, 100% solids) | 1.552 | 3.531 | Polyvinyl Chem. Ind. |

The ingredients are added in the order set forth above. Prior to addition of the cross-linking agent, the ingredients are stirred and milled in a ball mill or sand mill for uniform dispersion. After milling, the cross-linking agent is added and the mixture is applied at a coating of about 200 microinches (dry) onto a polyethylene terephthalate substrate using a conventional coating technique, namely, a gravure coater. The coating is then dried and calendared and the finished product is cut to the width desired for the recording application upon which it is to be used.

By way of comparison, a standard magnetic tape is formed using a conventional solvent base polyurethane digital magnetic tape.

A comparison of the conventional solvent based urethane tape and the aqueous urethane tape of the present invention is set out in the following Table III.

TABLE III

DIGITAL CASSETTE PERFORMANCE

| Parameter | Solvent Based Urethane Tape | Aqueous Urethane Tape |
|---|---|---|
| Amplitude, 800 BPI | 100% | 100% |
| Debris/Oxide Shed Rating | Good-Excellent | Good-Excellent |
| Coating Adhesion | Good-Excellent | Good-Excellent |
| Durability/Wear | >5000 passes | >5000 passes |

The foregoing tests illustrates that the aqueous coating composition of the present invention forms a magnetic tape of comparable properties to that of a conventional solvent based coating composition. The water-based system has the major advantage that it eliminates the use of expensive toxic flammable organic solvents and the necessity of solvent recapture.

What is claimed is:

1. An aqueous coating composition for forming a magnetic recording layer, said coating composition comprising a stable aqueous dispersion of magnetic pigment and polyurethane with carboxylic acid groups in the backbone chain.

2. The coating composition of claim 1 in which said dispersion is at a pH level in excess of 7.5.

3. The coating composition of claim 1 in which said dispersion includes a pH adjusting agent comprising ammonium hydroxide.

4. The coating composition of claim 1 in which said dispersion includes a polyfunctional cross-linking agent for said polyurethane.

5. The coating composition of claim 4 in which said cross-linking agent comprises a polyfunctional aziridine.

6. The coating composition of claim 1 in which said polyurethane is aromatic.

7. The coating composition of claim 1 in which said polyurethane is aliphatic.

* * * * *

Disclaimer 4,263,188.—*George J. Hampton*, Belmont and *William F. Maida*, San Jose, Calif. AQUEOUS COATING COMPOSITION AND METHOD. Patent dated Apr. 21, 1981. Disclaimer filed June 15, 1983, by the assignee, *Verbatim Corp.*

Hereby enters this disclaimer to all claims of said patent.

[*Official Gazette August 2, 1983.*]